US012191108B2

(12) United States Patent
Shimizu et al.

(10) Patent No.: US 12,191,108 B2
(45) Date of Patent: Jan. 7, 2025

(54) X-RAY TUBE

(71) Applicant: CANON ELECTRON TUBES & DEVICES CO., LTD., Otawara (JP)

(72) Inventors: Katsunori Shimizu, Otawara (JP); Hisayuki Tamura, Sakura (JP); Akihiro Sasabe, Otawara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 293 days.

(21) Appl. No.: 17/692,913

(22) Filed: Mar. 11, 2022

(65) Prior Publication Data

US 2022/0199347 A1 Jun. 23, 2022

Related U.S. Application Data

(63) Continuation of application No. PCT/JP2020/034563, filed on Sep. 11, 2020.

(30) Foreign Application Priority Data

Sep. 13, 2019 (JP) ................................ 2019-167643

(51) Int. Cl.
*H01J 35/06* (2006.01)
*H01J 35/18* (2006.01)

(52) U.S. Cl.
CPC .......... *H01J 35/066* (2019.05); *H01J 35/064* (2019.05); *H01J 35/18* (2013.01); *H01J 2235/18* (2013.01)

(58) Field of Classification Search
CPC ..................................................... H01J 35/066
See application file for complete search history.

(56) References Cited

U.S. PATENT DOCUMENTS

| | | | | |
|---|---|---|---|---|
| 4,823,371 A * | 4/1989 | Grady | H01K 35/147 | 378/114 |
| 7,576,481 B2 * | 8/2009 | Lemaitre | H01J 9/04 | 313/352 |
| 2019/0180970 A1 * | 6/2019 | Shimono | H01J 35/147 | |

FOREIGN PATENT DOCUMENTS

| | | |
|---|---|---|
| JP | 59-165353 A | 9/1984 |
| JP | 2001-068045 A | 3/2001 |
| JP | 2001-135265 A | 5/2001 |
| JP | 2007-115553 A | 5/2007 |

(Continued)

OTHER PUBLICATIONS

JP 2007-115553 A and its English translation (Year: 2007).*

(Continued)

*Primary Examiner* — Chih-Cheng Kao
(74) *Attorney, Agent, or Firm* — Oblon, McClelland, Maier & Neustadt, L.L.P.

(57) ABSTRACT

According to one embodiment, in an X-ray tube, an electron convergence cup has a first surface located closer to the anode, and an electron convergence groove opening on the first surface and housing a filament. The first surface has a first edge located on the opening, and a second edge located on the opening and opposite to the first edge in a first direction. The first edge is closer to an outer peripheral part than the second edge is. When the distance between the first edge and the filament in the first direction is defined as a first distance and the distance between the second edge and the filament in the first direction is defined as a second distance, the first distance is shorter than the second distance.

3 Claims, 5 Drawing Sheets

(56) References Cited

FOREIGN PATENT DOCUMENTS

| | | | | | |
|---|---|---|---|---|---|
| JP | 2019-036460 | A | | 3/2019 | |
| WO | WO-2017221743 | A1 | * | 12/2017 | .............. H01J 35/06 |

OTHER PUBLICATIONS

International Search Report issued Dec. 1, 2020 in PCT/JP2020/034563 filed on Sep. 11, 2020, 2 pages.
Extended European Search Report issued Aug. 16, 2023 in European Patent Application No. 20863508.6, 7 pages.

* cited by examiner

X-RAY TUBE

CROSS-REFERENCE TO RELATED APPLICATIONS

This application is a Continuation Application of PCT Application No. PCT/JP2020/034563, filed Sep. 11, 2020 and based upon and claiming the benefit of priority from Japanese Patent Application No. 2019-167643, filed Sep. 13, 2019, the entire contents of all of which are incorporated herein by reference.

FIELD

Embodiments described herein relate generally to an X-ray tube.

BACKGROUND

An X-ray tube is used for X-ray image diagnosis, non-destructive inspections, and the like. As X-ray tubes, a fixed anode X-ray tube and a rotation anode X-ray tube are known, each of which is used for an intended purpose. An X-ray tube includes an anode, a cathode, and a vacuum envelope. At the anode, a focal plane is formed, the focal plane emitting X-rays when an electron beam is incident on the focal plane. The cathode includes a filament, and an electron convergence cup having a convergence groove in which the filament is housed. The filament is capable of emitting electrons. A tube voltage is applied across the anode and the cathode. This allows the electron convergence cup to serve as an electron lens, that is, allows the electron convergence cup to converge an electron beam heading for the anode.

DETAILED DESCRIPTION

In general, according to one embodiment, an X-ray tube including: an anode that includes a target layer that emits an X-ray when an electron beam is incident on the target layer and an outer peripheral part encircling the target layer; and a cathode that includes a filament that emits a beam of electrons, the filament having a major axis in a first direction, and an electron convergence cup that converges the electron beam emitted from the filament. The electron convergence cup includes a first surface located on a side closer to the anode, and an electron convergence groove opening on the first surface and housing the filament. The first surface includes a first edge located on the opening, and a second edge located on the opening and opposite to the first edge in the first direction. The first edge is closer to the outer peripheral part than the second edge is. When the distance between the first edge and the filament in the first direction is defined as a first distance and the distance between the second edge and the filament in the first direction is defined as a second distance, the first distance is shorter than the second distance.

An embodiment will hereinafter be described with reference to the drawings. It should be noted that the present invention disclosed herein is merely an example, and that modifications which may be conceived by those who are skilled in art without deviating from the substance of the invention are obviously included in the scope of the invention. It should be noted also that to make description clearer, the drawings may provide schematic representations of the widths, thicknesses, shapes, and the like of actual components. Such schematic representations depict merely an example of the present invention, and do not put limits on interpretation of the present invention. In addition, in this specification and its accompanying drawings, constituent elements that are functionally similar to or identical with already described constituent elements will be denoted by the same reference signs and redundant detailed description of such constituent elements may be skipped when necessary.

Figure 1:
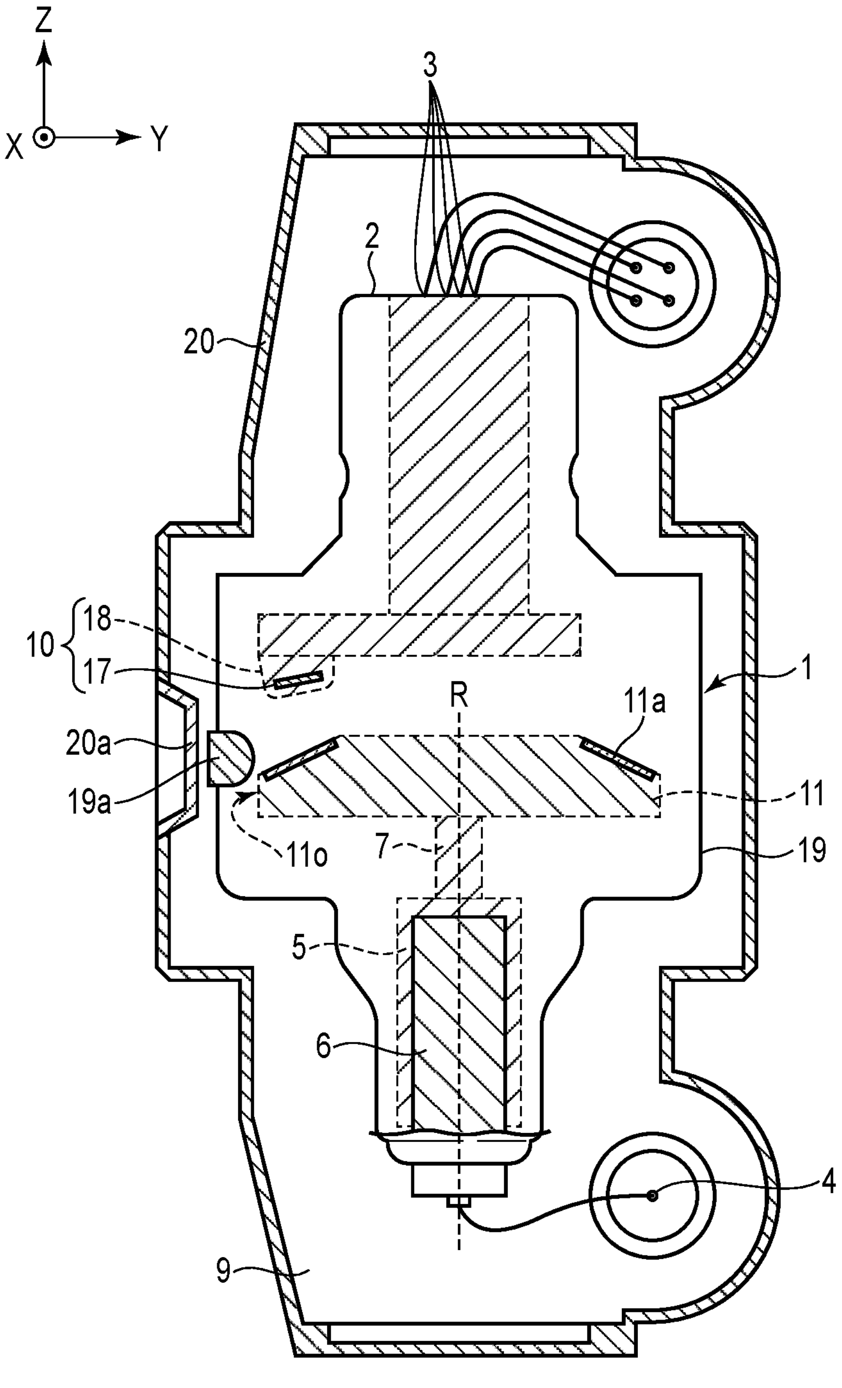
FIG. 1 is a cross-sectional view of an X-ray tube device according to an embodiment.

FIG. 1 is a cross-sectional view of an X-ray tube device according to an embodiment.

As shown in FIG. 1, the X-ray tube device includes an X-ray tube 1, a housing 20, and insulating oil 9. In this embodiment, the X-ray tube 1 is a rotation anode X-ray tube.

The X-ray tube 1 includes a cathode 10, an anode 11, a rotary body 5, a fixed body 6, a vacuum envelope 19, and a stem 2.

The rotary body 5 is formed into a cylindrical shape with its one end closed. The rotary body 5 extends along a rotation axis R serving as an axis around which the rotary body makes rotation movement. The rotary body 5 is capable of rotating around the rotation axis R. The rotary body 5 is formed of such a material as Fe (iron) or Mo (molybdenum). A direction Z is a direction parallel to the rotation axis R, and a direction X, a direction Y, and the direction Z are perpendicular to each other.

The fixed body 6 is formed into a columnar shape. The diameter of the fixed body 6 is smaller than the inner diameter of the rotary body 5. The fixed body 6 is set coaxial with the rotary body 5, and extends along the rotation axis R. The fixed body 6 is formed of such a material as Fe or Mo. The fixed body 6 is fitted to the rotary body 5, and is fixed to the vacuum envelope 19. A gap between the rotary body 5 and the fixed body 6 is filled with a metal lubricant, such as a gallium-indium-tin (GaInSn) alloy, which is not illustrated. Because of this, the X-ray tube 1 is provided with a sliding bearing.

The anode 11 is disposed counter to one end of the fixed body 6 in a direction along the rotation axis R. The anode 11 has a target layer 11*a* located on the outer surface of the anode, and an outer peripheral part 11*o* encircling the target layer 11*a*. The anode 11 is fixed to the rotary body 5 via a connecting member 7. The anode 11 is formed of a heavy metal material, such as Mo. The target layer 11*a* is formed of a metal with a melting point higher than that of the material making up the anode 11. The target layer 11*a* is formed of, for example, a tungsten alloy.

The anode 11 is set coaxial with the rotary body 5 and with the fixed body 6. The anode 11 is capable of rotating around the rotation axis R. The anode 11 emits X-rays when electrons emitted from the cathode 10 collide with the target layer 11*a*. The anode 11 is electrically connected to a terminal 4 via the rotary body 5, the fixed body 6, and the like.

The cathode 10 has a filament 17, and an electron convergence cup 18. The cathode 10 is disposed counter to the target layer 11*a* of the anode 11, with a gap formed between the cathode 10 and the target layer 11*a*. The filament 17 emits electrons that collide with the target layer 11*a*. The electron convergence cup 18 is disposed in such a way as to encircle the trajectory of electrons flying from the filament 17 to the anode 11, and functions as a convergence electrode.

The vacuum envelope 19 houses the anode 11 and the cathode 10. The vacuum envelope 19 is formed of an insulating material, such as glass and ceramic, or of a combination of an insulating material and such a conductive material as metal. The vacuum envelope 19 is sealed up to keep its interior in a vacuum state. The vacuum envelope 19 has an X-ray transmission window 19*a* that transmits X-rays, the X-ray transmission window 19*a* being located near the target layer 11*a* counter to the cathode 10. The stem 2 is connected to the vacuum envelope 19, and is fitted with a plurality of pins 3.

The housing 20 houses the X-ray tube 1. The housing 20 has an X-ray transmission window 20*a* that transmits X-rays, the X-ray transmission window 20*a* being located near the target layer 11*a* counter to the cathode 10. The housing 20 houses the X-ray tube 1 and the like, and is filled with the insulating oil 9 serving as a coolant. The housing 20 houses a stator coil as well (not illustrated), which causes the rotary body 5 to rotate.

Figure 2:
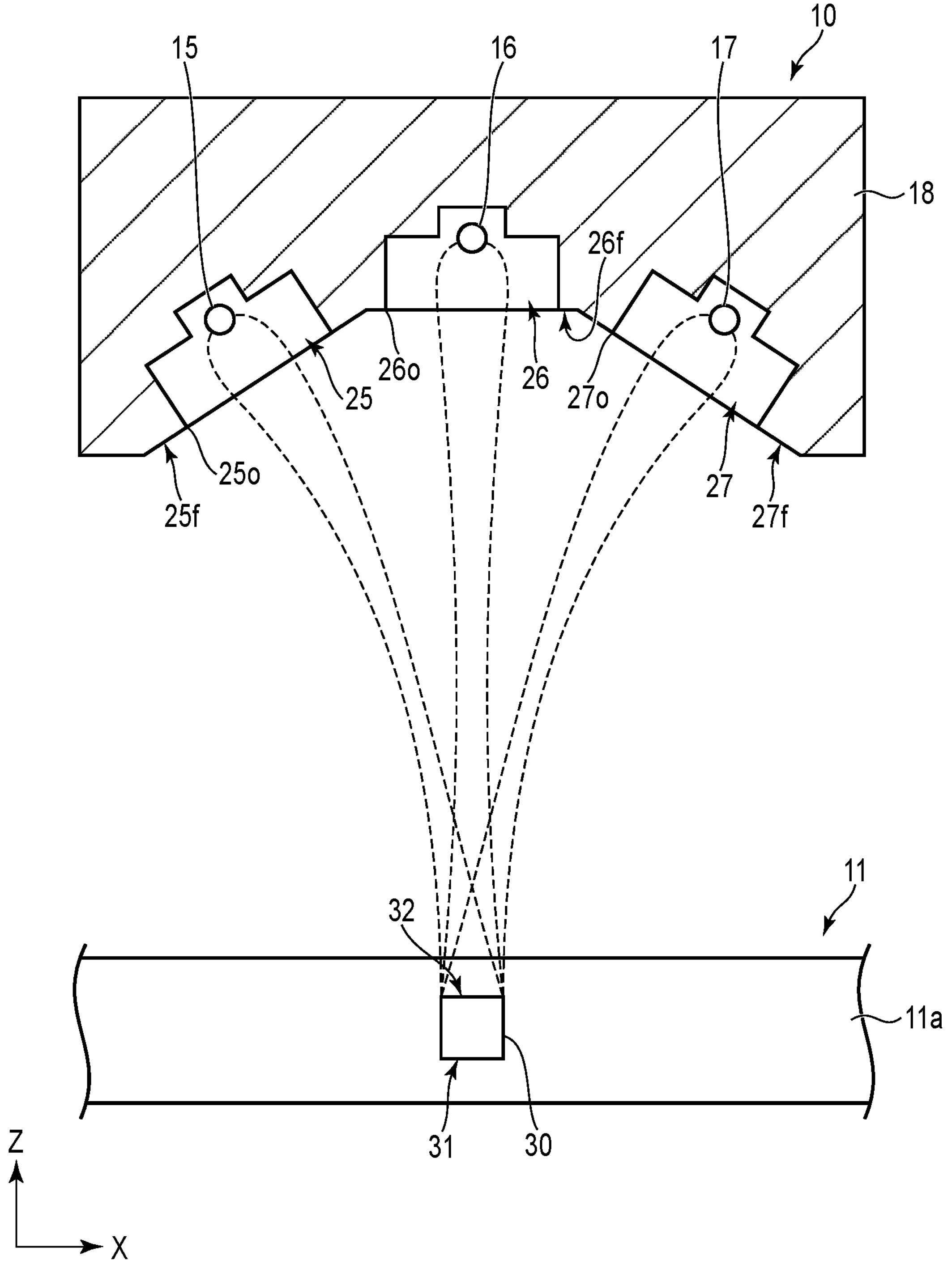
FIG. 2 is a cross-sectional view of a cathode and an anode that are shown in FIG. 1.

FIG. 2 is a cross-sectional view of the cathode 10 and the anode 11 that are shown in FIG. 1.

As shown in FIG. 2, the cathode 10 has a filament 15, a filament 16, and the filament 17. In this embodiment, therefore, the cathode 10 has three filaments. The cathode 10, however, may have one filament or two filaments.

The filaments 15 to 17 are arranged at intervals in the direction of rotation of the target layer 11*a*. In this embodiment, the filaments 15 to 17 are each formed of a material containing tungsten as a main component. The filaments 15 to 17 and the electron convergence cup 18 are connected respectively to the pins 3 shown in FIG. 1.

The electron convergence cup 18 has a surface 25*f*, a surface 26*f*, and a surface 27*f* that are located on a side closer to the anode 11. Each of the surfaces 25*f* to 27*f* faces the anode 11. In the example of FIG. 2, the surface 25*f*, the surfaces 26*f*, and 27*f* are continuous with each other, and the surface 25*f* and the surface 27*f* are inclined against the surface 26*f*.

The electron convergence cup 18 has one or a plurality of electron convergence grooves in which the filaments are placed. In this embodiment, the electron convergence cup 18 has three electron convergence grooves (electron convergence groove 25, electron convergence groove 26, and electron convergence groove 27) in which the filaments 15 to 17 are placed, respectively. The electron convergence groove 25 forms an opening 25*o* on the surface 25*f*, the electron convergence groove 26 forms an opening 26*o* on the surface 26*f*, and the electron convergence groove 27 forms an opening 27*o* on the surface 27*f*.

Each of the filaments 15 to 17 and the electron convergence cup 18 is supplied with a relatively negative current. The anode 11 is supplied with a relatively positive voltage. An X-ray tube voltage (which will hereinafter be referred to as a tube voltage) is applied across the anode 11 and the cathode 10. This tube voltage accelerates electrons emitted from the filaments 15 to 17, causing a beam of electrons to fall onto the target layer 11*a*. The tube voltage, for example, is equal to or higher than 50 kv and equal to or lower than 160 kv.

Groups of electrons emitted from the filaments 15 to 17 are converged by electric fields in the vicinity of the openings 25*o* to 27*o* of the electron convergence grooves 25 to 27, respectively, and form a focal plane 30 on the target layer 11*a*. The focal plane 30 has a length direction corresponding to the direction of inclination of the target layer 11*a* and a width direction corresponding to the direction of rotation of the anode 11. The focal plane 30 has an end 32 close to the rotation center of the anode 11, and an end 31 distant from the rotation center of anode 11.

A configuration of the X-ray tube device according to the exemplary example of this embodiment and a configuration of an X-ray tube device according to a comparative example will be described. The X-ray tube device of the exemplary example and the same of the comparative example are identical in configuration, except the electron convergence cup 18.

Figure 3:
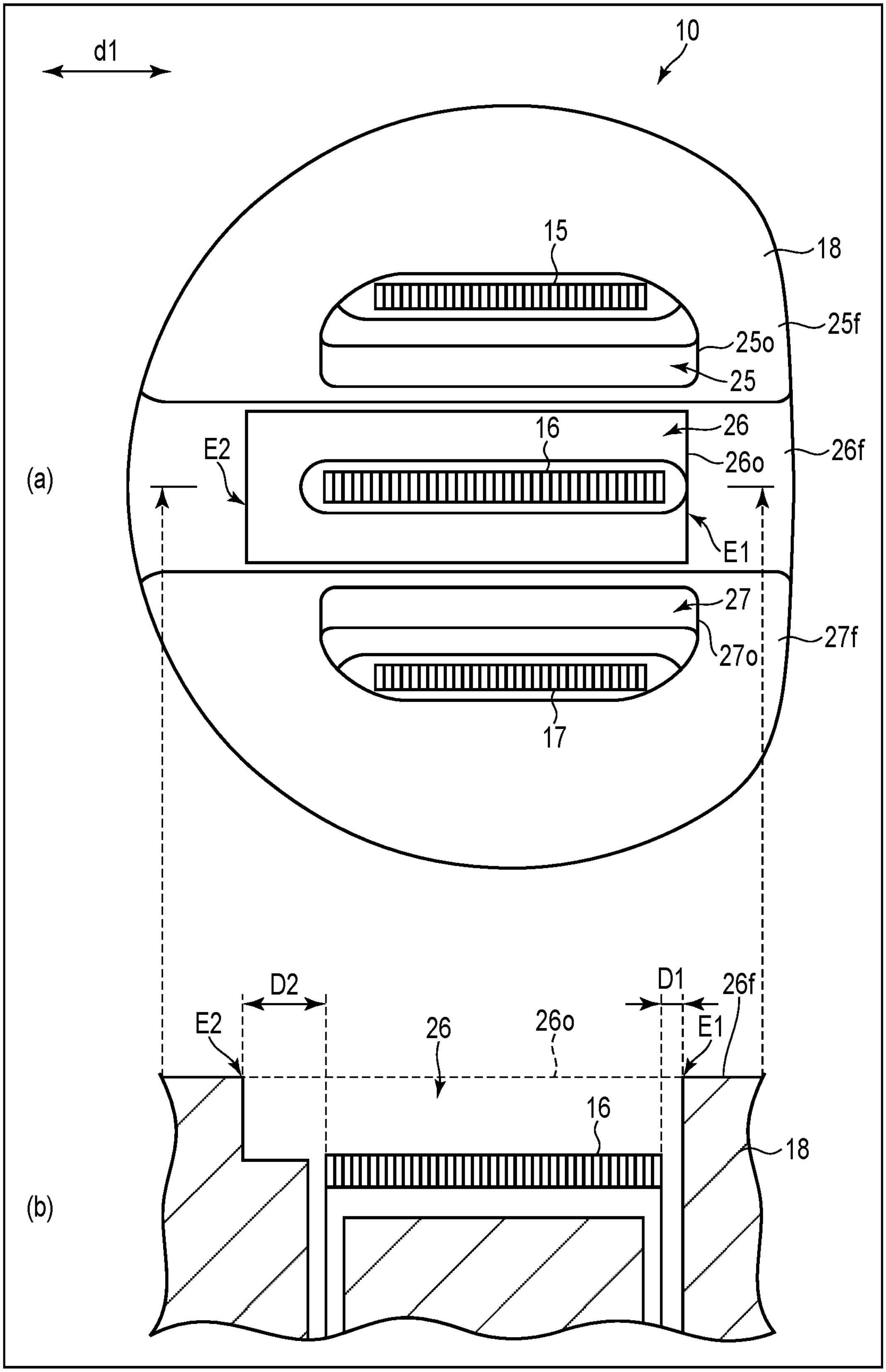
FIG. 3 is an enlarged view of the cathode of an exemplary example of the embodiment, including (a) showing a front view of the cathode and (b) showing a cross-sectional view of the cathode.

FIG. 3 is an enlarged view of the cathode 10 of the exemplary example of the embodiment, including (a) showing a front view of the cathode 10 and (b) showing a cross-sectional view of the cathode 10.

As shown in FIG. 3, each of the filaments 15 to 17 is a filament coil having a major axis in a direction d1. The direction d1 is a direction intersecting the direction Y shown in FIG. 1, but the direction d1 may be parallel to the direction Y. The filament 16 is larger than each of the filaments 15 and 17 in the direction d1.

The opening 26*o* is formed on the surface 26*f*, as a rectangular opening, and has a length direction corresponding to the direction d1. The surface 26*f* has an edge E1 and an edge E2 that are located on the opening 26*o*. The edge E1 and the edge E2 are counter to each other in the direction d1.

Now attention is paid to a positional relationship between the filament 16 and the opening 26*o*. The distance between the filament 16 and the edge E1 in the direction d1 is defined as a distance D1, and the distance between the filament 16 and the edge E2 in the direction d1 is defined as a distance D2. The distance D1 is shorter than the distance D2. It is preferable that the distance D2 be 1.25 times or more the distance D1. It is more preferable that the distance D2 be 1.3 mm or more. As shown in (a) of FIG. 3, the filament 16 is closer to the edge E1 than to the edge E2. It can be said that the filament 16 is shifted in location from the center of the opening 26*o* in the direction d1.

The X-ray tube of this embodiment is structured such that it forms focal points of different sizes on the target layer when, for example, adjusting an X-ray dose.

In this embodiment, the direction d1 is equivalent to a first direction, the edge E1 is equivalent to a first edge, the edge E2 is equivalent to a second edge, the distance D1 is equivalent to a first distance, and the distance D2 is equivalent to a second distance.

Figure 4:
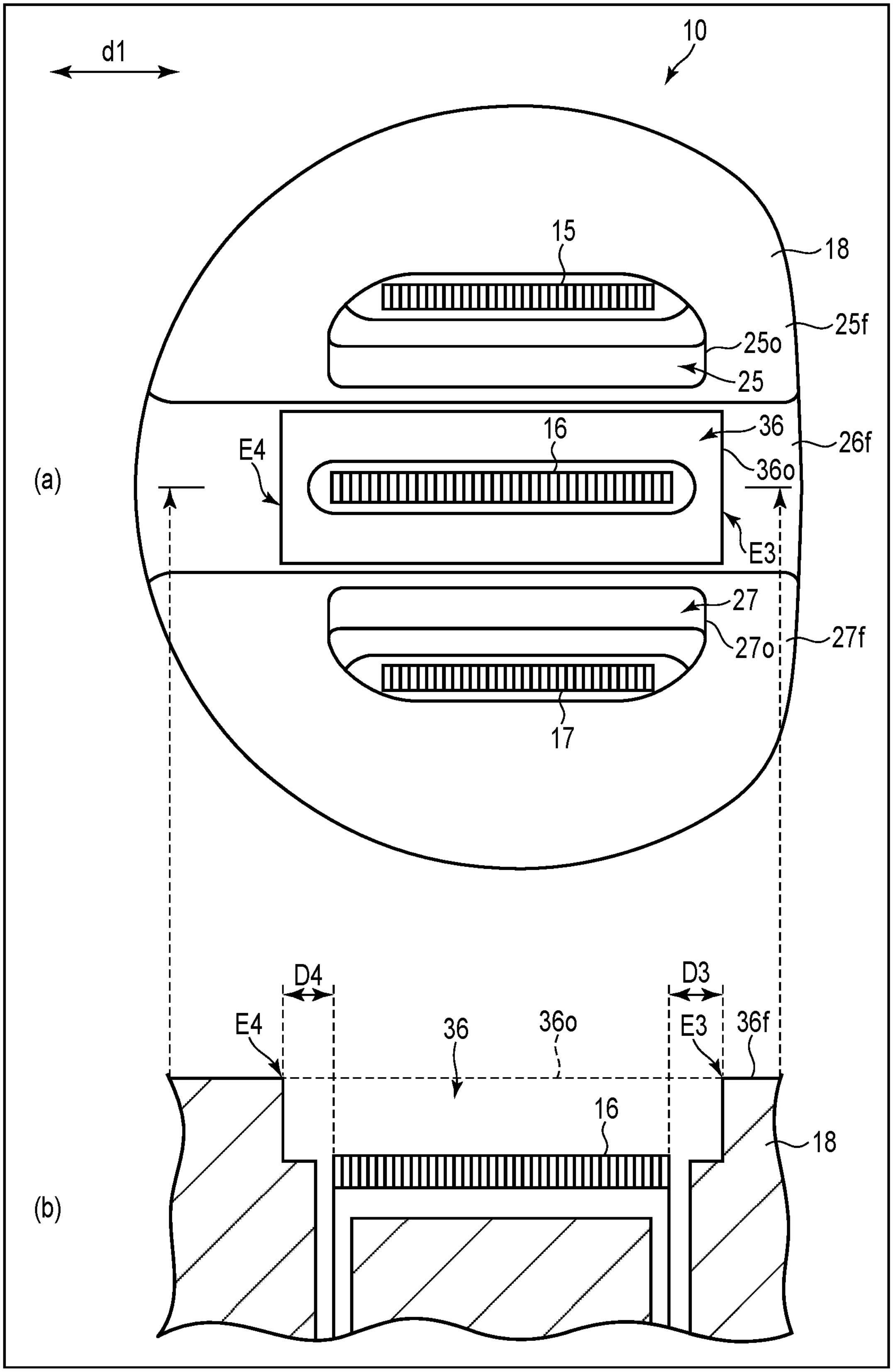
FIG. 4 is an enlarged view of a cathode of a comparative example, including (a) showing a front view of the cathode and (b) showing a cross-sectional view of the cathode.

FIG. 4 is an enlarged view of the cathode 10 of the comparative example, including (a) showing a front view of the cathode 10 and (b) showing a cross-sectional view of the cathode 10.

The comparative example shown in FIG. 4 is different from the exemplary example shown in FIG. 3 in that the electron convergence cup 18 has an electron convergence groove 36 in place of the electron convergence groove 26.

The electron convergence groove 36 forms an opening 36*o* on the surface 26*f*. The opening 36*o* is formed on the surface 26*f*, as a rectangular opening, and has a length direction corresponding to the direction d1. The surface 26*f* has an edge E3 and an edge E4 that are located on the opening 36*o*. The edge E3 and the edge E4 are counter to each other in the direction d1.

Now attention is paid to a positional relationship between the filament 16 and the opening 36*o*. The distance between the filament 16 and the edge E3 in the direction d1 is defined as a distance D3, and the distance between the filament 16 and the edge E4 in the direction d1 is defined as a distance D4. The distance D3 and the distance D4 are equal to each other. As shown in (a) of FIG. 4, the filament 16 is disposed at the center of the opening 36*o*.

Figure 5:
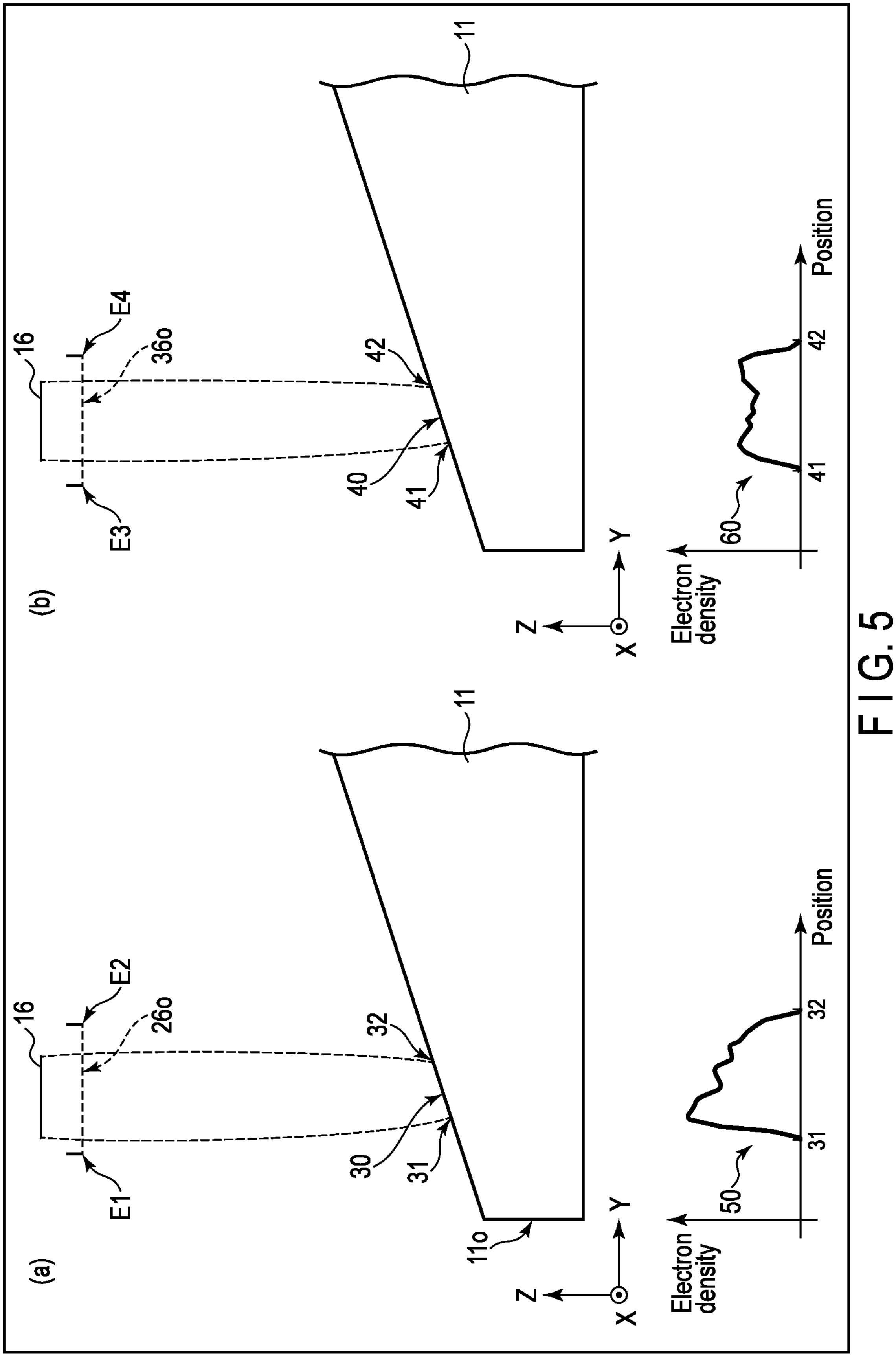
FIG. 5 is a diagram for explaining an electron density distribution of a focal plane in its length direction, including (a) showing a schematic of the X-ray tube device of the embodiment and an electron density distribution of a focal plane, and (b) showing a schematic of an X-ray tube device of the comparative example and an electron density distribution of a focal plane.

FIG. 5 is a diagram for explaining an electron density distribution of a focal plane in its length direction (direction of inclination of the target layer 11*a*), including (a) showing a schematic of the X-ray tube device of the exemplary example and an electron density distribution, and (b) showing a schematic of the X-ray tube device of the comparative example and an electron density distribution.

As shown in (a) of FIG. 5, an electron beam emitted from the filament 16 is converged by an electric field (not illustrated) formed on the front face of the opening 26*o*. As a result, an electron density distribution in the length direction of the focal plane 30 (direction heading from the end 31 toward the end 32) is given as an electron density distribution 50. The electron density distribution 50 is a triangular distribution curve with one peak. In the example of (a) of FIG. 5, the edge E1 is closer to the outer peripheral part 11*o* of the anode 11 than the edge E2, in the direction Y. It should be noted that the edge E1 may be closer to the outer peripheral part 11*o* than the edge E2, in the radial direction of the anode 11.

As shown in (b) of FIG. 5, an electron beam emitted from the filament 16 is converged by an electric field (not illustrated) formed on the front face of the opening 36*o*. As a result, an electron density distribution in the length direction of a focal plane 40 (direction heading from an end 41 toward an end 42) is given as an electron density distribution 60. The focal plane 40 and the focal plane 30 are of the same size. The electron density distribution 60 is a trapezoidal distribution curve with two peaks. Generally, the case of an electron density distribution curve with two separated peaks leads to lower X-ray image resolution. This is analogous to a case where emitting light from two spots onto an object results in blurring of the shadow of the object.

According to this embodiment, the filament 16 is shifted in location from the center of the opening 260 of the electron convergence groove 26. On the side where the distance between a front edge of the opening 26*o* and the filament 16 is shorter (i.e., the side closer to the edge E1), the intensity of the electric field acting on electrons is greater and therefore a convergence effect is greater. On the side where the distance between the front edge of the opening 26*o* and the filament 16 is longer (i.e., the side closer to the edge E2), the intensity of the electric field acting on electrons is weaker and therefore the convergence effect is weaker. The intensity of the electric field on the front face of the opening 26*o* thus increases as it goes from the center of the anode 11 toward the outer peripheral part 11*o*. As a result, electron density increases in the direction of heading from the end 32 toward the end 31, in which case the electron density distribution 50, i.e., the triangular distribution curve with one peak can be obtained.

Compared with the X-ray tube of the comparative example, the X-ray tube 1 of the exemplary example can generate X-rays with higher intensity under a condition that the focal plane sizes of both X-ray tubes are the same, and therefore offers an X-ray image with high resolution.

In addition, because the electron density distribution 50 is a triangular distribution curve with one peak, an apparent size (effective size) of the focal plane 30 is smaller than the actual size of the focal plane 30. This puts limits on a direction in which X-rays are emitted, allowing obtaining an X-ray image with higher resolution.

The smaller the effective size of the focal plane 30 is, the higher the surface temperature of the focal plane 30 becomes, which raises a possibility that the target layer 11*a* may melt. According to this embodiment, the edge E1 is closer to the outer peripheral part 11*o* of the anode 11 than the edge E2 is On the outer peripheral side of the anode 11 that has a larger orbit radius and a higher rotation speed, a rise in the surface temperature of the focal plane 30, the rise in the surface temperature being caused by an electron beam's colliding with the focal plane 30, can be kept smaller than a rise in the surface temperature that occurs on the inner peripheral side of the anode 11 that has a smaller orbit radius and a lower rotation speed. By locating the side where the electron beam intensity is higher (i.e., the side closer to the edge E1) such that the side is closer to the outer peripheral part 11*o* of the anode 11 in a positional relationship with the anode 11, therefore, the rise in the surface temperature of the focal plane 30 can be suppressed, and therefore a drop in the reliability of the X-ray tube can be prevented.

As described above, this embodiment provides an X-ray tube that makes the electron density distribution of the focal plane sparse and dense in the length direction of the focal plane, thereby emitting X-rays with high intensity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The filament as an electron emission source is not limited to the filament coil, and various types of filaments may be used in place of the filament coil. For example, the cathode 10 may have a flat filament in place of the filament coil. This case offers the same effects as the above-described embodiment offers. The flat filament is a filament of a flat board shape having a filament upper surface (electron emission surface) and a back surface, which are both flat surfaces.

For example, the embodiment of the present invention is not limited to the X-ray tube 1 of the rotation anode type described above, but may be applied to various rotation anode X-ray tubes, fixed anode X-ray tubes, and other types of X-ray tubes.

What is claimed is:

1. An X-ray tube, comprising:

an anode that includes a target layer that emits an X-ray when an electron beam is incident on the target layer and an outer peripheral part encircling the target layer; and a cathode that includes a filament that emits a beam of electrons, the filament having a major axis in a first direction, and an electron convergence cup that converges the electron beam emitted from the filament, wherein the electron convergence cup includes a first surface located closer to the anode, and an electron convergence groove opening on the first surface and housing the filament, the first surface includes a first edge located on the opening, and a second edge located on the opening and opposite to the first edge in the first direction, the first edge is closer to the outer peripheral part than the second edge is, and when a distance between the first edge and the filament in the first direction is defined as a first distance and a distance between the second edge and the filament in the first direction is defined as a second distance, the first distance is shorter than the second distance, and the second distance is 1.3 mm or more.

2. The X-ray tube according to claim 1, wherein the second distance is 1.25 times or more the first distance.

3. The X-ray tube according to claim 1, wherein a voltage of 50 kv or more and 160 kv or less is applied across the target layer and the cathode.

* * * * *